Sept. 27, 1960 G. V. MUMFORD 2,953,814
METHOD AND APPARATUS FOR FORMING AND TRIMMING
ARTICLES FROM PLASTIC SHEETS
Filed July 18, 1957 5 Sheets-Sheet 1

INVENTOR
GEORGE V. MUMFORD
BY
Reele and Hoge
ATTORNEYS

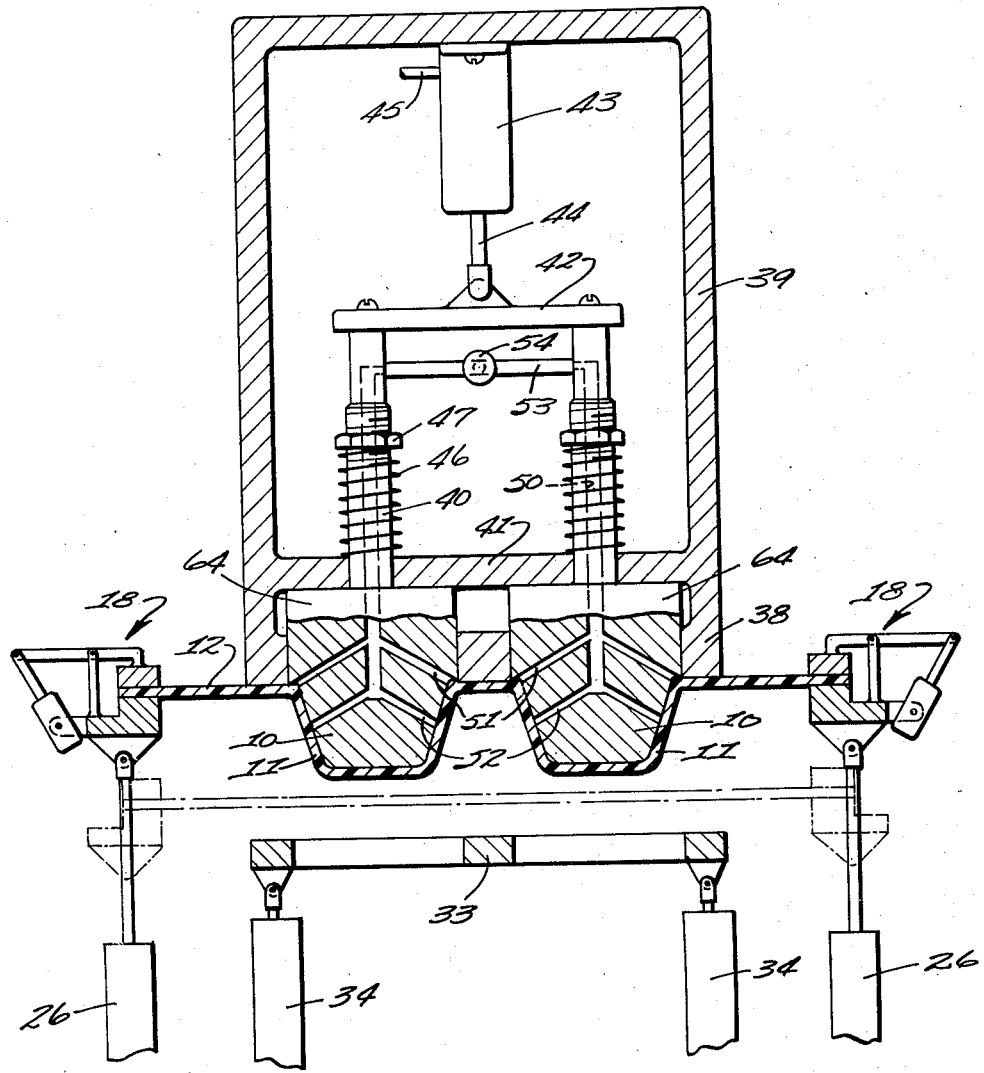

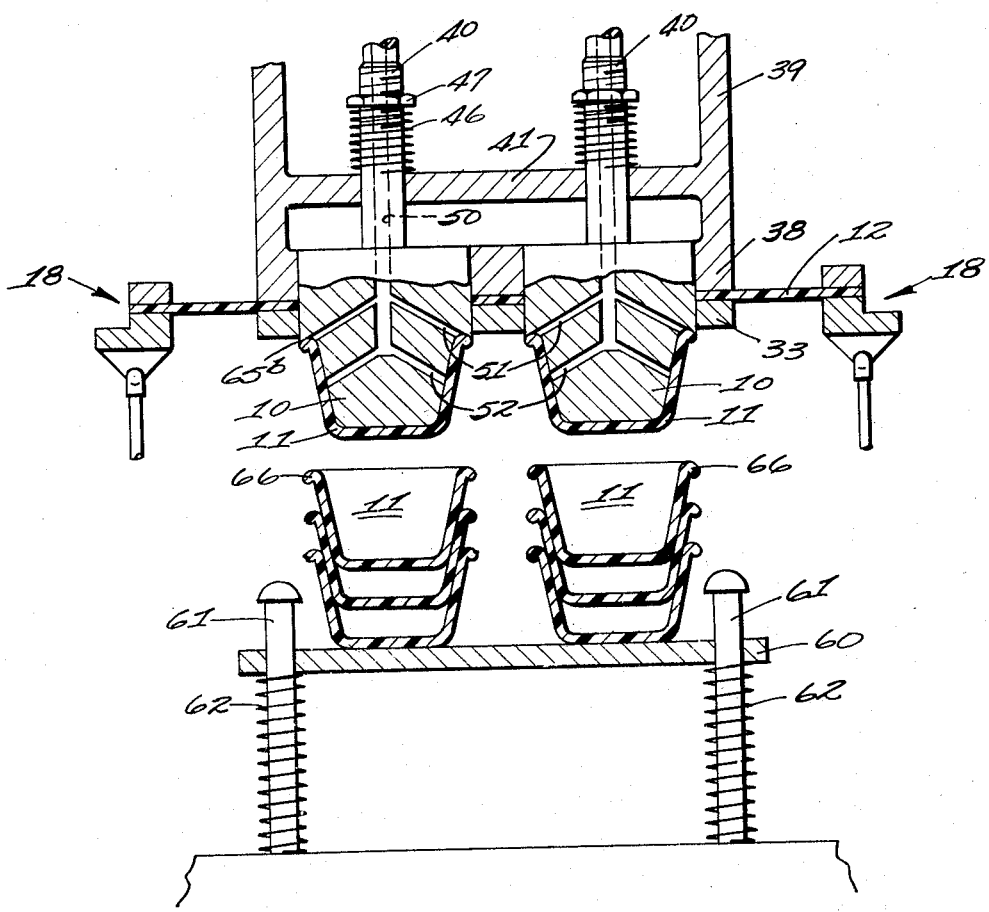

Sept. 27, 1960  G. V. MUMFORD  2,953,814
METHOD AND APPARATUS FOR FORMING AND TRIMMING
ARTICLES FROM PLASTIC SHEETS
Filed July 18, 1957  5 Sheets-Sheet 4
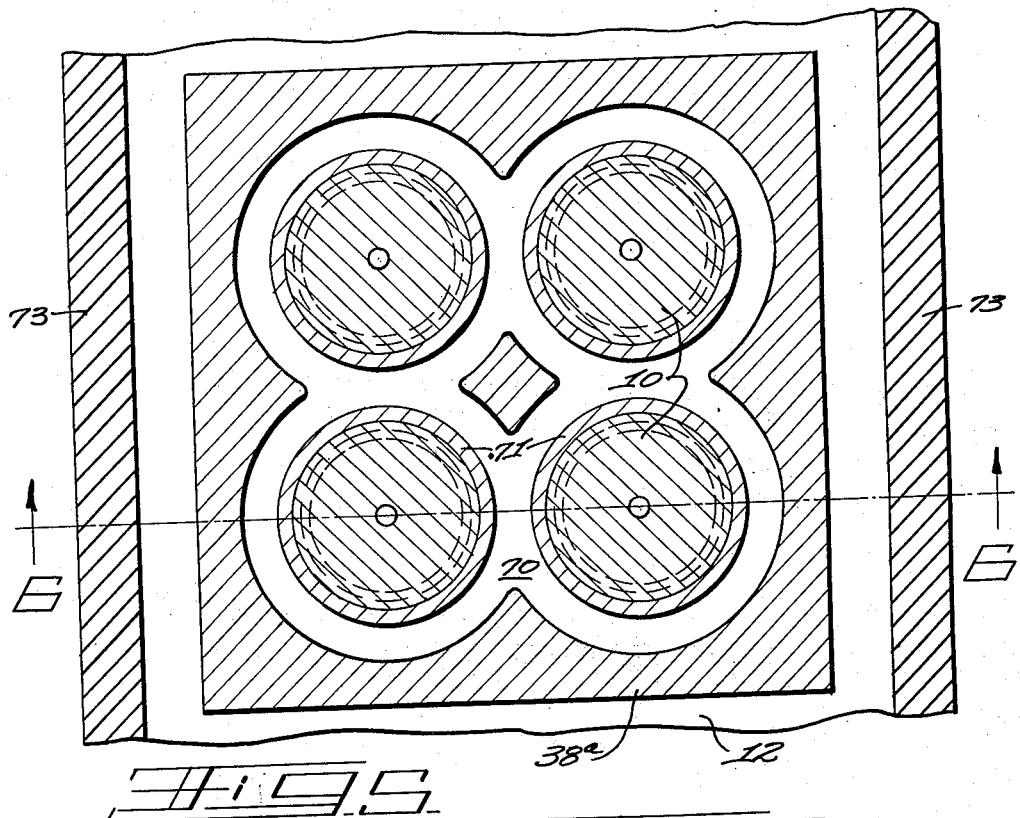
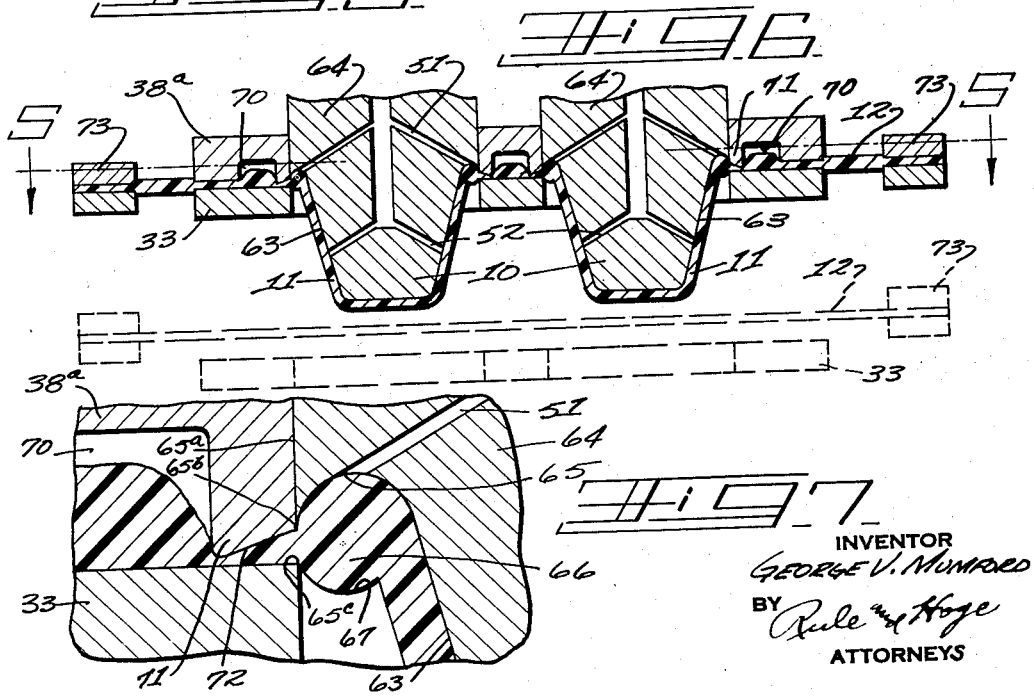
INVENTOR
GEORGE V. MUMFORD
BY
ATTORNEYS

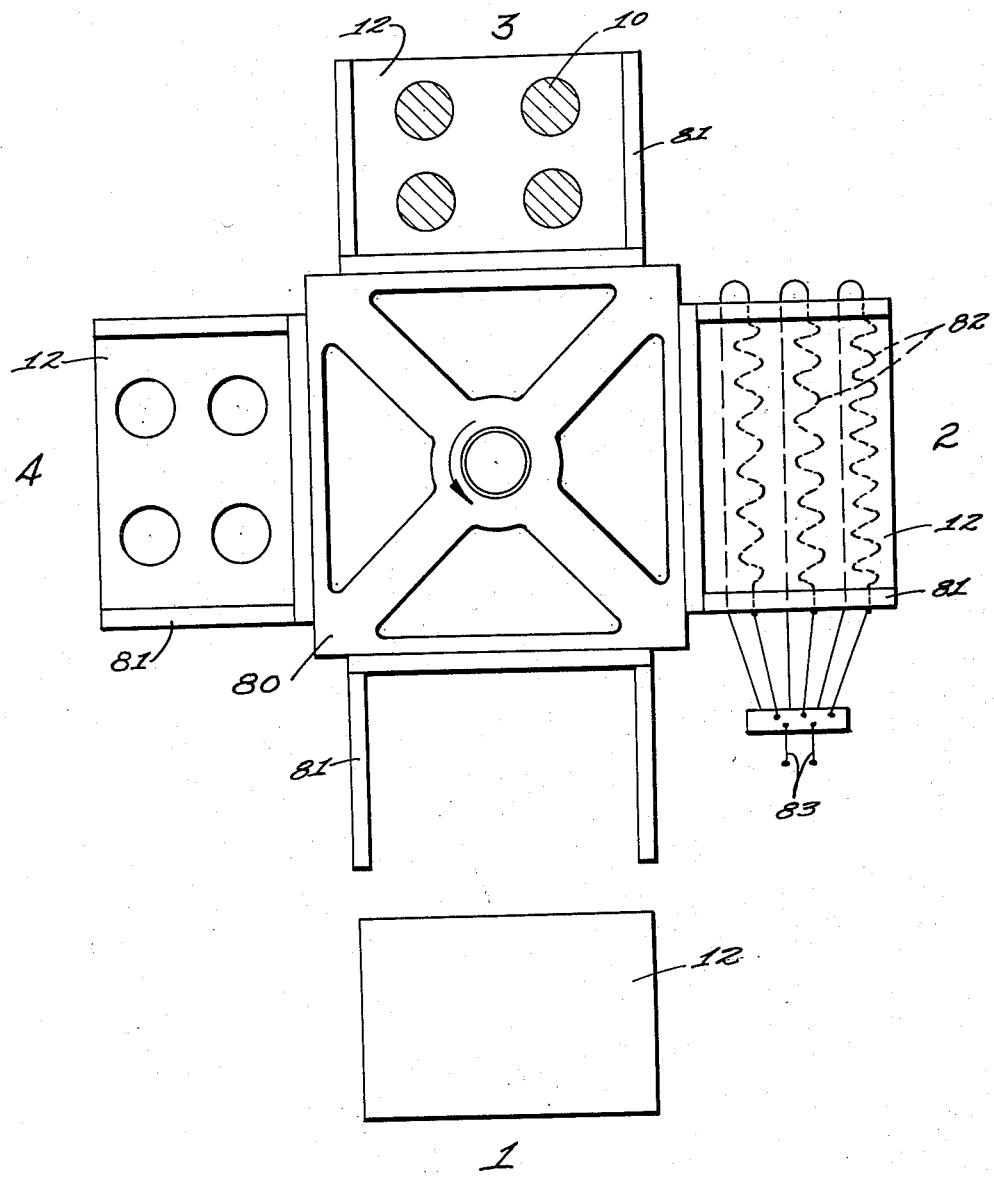

United States Patent Office 2,953,814
Patented Sept. 27, 1960

2,953,814

METHOD AND APPARATUS FOR FORMING AND TRIMMING ARTICLES FROM PLASTIC SHEETS

George V. Mumford, Toledo, Ohio, assignor to Owens-Illinois Glass Company, a corporation of Ohio Filed July 18, 1957, Ser. No. 672,620

6 Claims. (Cl. 18—19)

My invention relates to methods and means for forming or molding articles from thermoplastic sheet material while in a heated, plastic condition.

Molding hollow articles from plastic sheet material is well known in the prior art, and the usual method of trimming such articles from the parent sheet comprises the use of separate dies, which operate after the sheet has been separated from the forming molds.

An object of the present invention is to provide a novel method and means by which the articles are separated from the parent sheet with the dies of elements used for molding the material and as a part of the molding operation. The present method permits the article to be severed from the parent sheet during the cooling cycle, and in the same operation by which the articles are molded.

A further object of the invention is to provide automatic means for stacking the molded articles as they are released from the molding elements.

In accordance with the present invention, the plastic sheet material, either roll fed, sheet fed, or coming directly from an extruder, is clamped in a frame and brought to the proper temperature in a moldable condition by radiant heaters, infra-red lamps, or other suitable heating means. The plastic sheet is then positioned between upper and lower platens, the upper platen containing the male molding elements or forms, and the lower platen comprising a trim die. The sheet is then raised to drape the sheet material over the male forms, and a vacuum is then drawn between the forms and the sheet to mold the material to the forms. At the proper time during the cooling cycle, when the sheet is sufficiently solidified to permit shearing, the male forms and a trim die are relatively moved to effect a severing of the molded ware from the parent sheet. After severance of the molded articles from the sheet, air under pressure may be admitted through the vacuum ports in the male dies to eject the ware. The articles, as released, may accumulate in stacked form on a stacking rack. When the male dies or forms and the trim die separate, the sheet is stripped from the dies by a stripping plate. The molds are then ready for the next sheet.

Referring to the accompanying drawings which illustrate apparatus for use in practicing the invention:

Fig. 1 is a fragmentary sectional elevation, showing male dies or forms and means for cooling the dies;

Fig. 2 is a sectional elevation, with parts broken away, showing a plastic sheet between the dies;

Fig. 3 is a view similar to Fig. 2, showing the plastic sheet lifted and draped over the male dies, and also showing means for operating the male dies;

Fig. 4 is a view showing a further step in the operation, in which the trim die has been lifted and the male dies or forms operated to sever and trim the molded articles, also showing stacking means for the articles;

Figs. 5 to 7 illustrate a modified form of apparatus;

Fig. 5 is a sectional plan view at the line 5—5 on Fig. 6, showing the form dies and stripper plate;

Fig. 6 is a section at the line 6—6 on Fig. 5;

Fig. 7 is a fragmentary view on a comparatively large scale, illustrating the method and the means for molding, trimming and severing the bead from the plastic sheet; and Fig. 8 is a diagrammatic plan view of an apparatus which may be used for holding the plastic sheet and advancing it from one station to another.

Referring particularly to Figs. 1 to 4, male molding dies or forms 10, shown in frusto-conical form, are used for molding and shaping hollow articles 11 of thermoplastic material. These articles are molded and severed from sheets 12 of the material while the latter is in a heated plastic condition. Means for cooling or adjusting the temperature of the molding heads 10 after a molding operation comprises a cooling device 15 (Fig. 1). Cooling air is supplied through a pipe 16 to the cooling chamber, and jets of cooling air are directed against the molds 10 through ports 17. The cooling head 15, after a cooling operation, is withdrawn to the retracted position 15a, shown in broken lines.

The plastic sheet 12 is secured in a clamping device or frame 18, including lower and upper clamping members 19 and 20, respectively. The upper clamping member 20 is attached to arms 21 pivoted at 22 to post 23 on the lower member 19. The arms or levers 21 are operated by piston motors 24 comprising piston rods 25 connected to the arms 21. The clamping devices 18 are bodily movable upwardly for draping the plastic sheet over the forms 10. Means for moving the clamping frame up and down include vertical piston motors 26, mounted on a base 27. The motor pistons 28 are moved upwardly by air pressure, which may be supplied through pipes 29. The clamping frame may be lowered by gravity, supplemented by spring pressure applied by compression coil springs 30 in the motor cylinders.

A trim die 33 is mounted for up-and-down movement for cooperation with the forming dies for trimming the formed articles as hereinafter described. The trim die is moved up and down by piston motors 34 (see Fig. 2) mounted on the base 27. These motors or cylinders may be of the same construction as the cylinders 26, and are operated in like manner. Air pressure is supplied to the cylinders 34 through pipes 35 under the control of a valve 36.

A stripper plate 38, as shown, forms an integral part of a frame 39. The dies 10 are mounted for up-and-down movement in the frame 39. Each of the dies 10 is formed with a stem 40, extending upwardly through a web or plate 41, forming an integral part of the frame 39. The stems 40 are connected by a transverse bar or yoke 42. Means for moving the dies 10 up and down includes a piston motor 43 or cylinder attached to the frame 39 and having its piston rod 44 connected to the yoke 42. Air pressure for lowering the dies is supplied through a pipe 45. The dies are lifted by coil compression springs 46 mounted on the stems 40 and held under compression between the web 41 and nuts 47 screw threaded on the stems 40.

Means for applying suction through the forming heads 10 for molding the sheet material comprises a vacuum line including channels 50 extending lengthwise through the stems 40 and into the heads 10, and branch channels 51 and 52. The vacuum line is extended from the channels 50 through pipes 53 and a control valve 54.

In operation, the sheet 12, while held in the clamping frame 18 (Fig. 2), after being heated to the required temperature and in plastic condition for molding, is positioned beneath and spaced below the dies 10, as shown in Fig. 2. Air pressure is then supplied to the cylinders 26 for lifting the frame 18 and sheet 12 upwardly to the position shown in full lines in Fig. 3. The plastic sheet is thereby draped over the dies or forms 10. The vacuum line may then be opened by the valve 54, thereby applying suction through the heads 10 and molding the sheet material over the forms 10. The trim die 33 is then moved upward to the Fig. 4 position, thereby clamping the sheet between the stripper plate 38 and the trim die. The plastic material is squeezed between the die 33 and the stripper plate 38, thereby forcing a portion of the material into the bead-forming portion of the mold. The molds 10 are then moved downward and sever the molded articles, as shown in Fig. 4. The vacuum is then released and air supplied through the vacuum line so that the articles 11 drop from the mold. As shown in Fig. 4, the articles are accumulated in nested form on a supporting plate 60. The plate 60 is mounted for up-and-down movement on posts 61 and, when empty, is held in its upper position by light coil compression springs 62. The plate 60 is gradually moved downward by the weight of the articles 11 as they accumulate on the plate.

Each of the male forms or molds 10 includes a lower end portion or head with a tapered or frusto-conical molding surface 63 (Fig. 2) and an upper cylindrical body portion 64. The molding surface 63 includes an upper channel-shaped end portion 65 (Fig. 7) for forming the upper surface portion of a bead 66, formed on the rim of the molded article. The bead is preferably substantially circular in cross-section. The lower surface portion 67 (Fig. 7) of the bead is formed by squeezing or forcing a portion of the plastic sheet into the bead-forming space or cavity. The circumferential surface 65a of the cylindrical mold body 64 is tangential to the molding surface 65, as shown in Fig. 7, and terminates in a knife edge 65b. When the molding heads are moved downward (Fig. 4) the shearing edges 65b sever the molded beads from the sheet 12, thereby completing the molding operation. After the shearing operation the trim die is moved down and the sheet 12 is stripped from the dies 10 by downward movement of the stripper plate 38 relative to the dies 10.

Figs. 5 to 7 illustrate a modified construction. The stripper plate 38a, as here shown, is rectangular and formed with recesses or channels 70 in its under surface. Annular ribs 71 define the inner side walls of the channels. The depending ribs or flanges 71 surround the mold bodies 64 which are mounted for up-and-down sliding movement therein. The lower or bottom surface 72 of each rib 71 may be tapered as shown in Fig. 7. The primary purpose of this construction comprising the ribs 71 is to keep the compression area between the trim die 33 and the stripper plate 38a substantially uniform throughout the circumference of the bead 66 which is being molded.

In the operation of the apparatus as shown in Figs. 5 to 7, the sheet stock is clamped along its edges in a clamping frame 73, by which the stock may be advanced to a position beneath the molding heads 10, as shown in broken lines in Fig. 6. The frame 73, with the sheet therein, is then raised so that the sheet is draped over the forms 10. A vacuum is then applied to draw the material into shape. The trim die 33 is then raised to engage the marginal portions of the sheet surrounding the heads 10, and to compress the sheet between the trim die 33 and the stripper plate 38a. The suction applied through the branch channels 51 withdraws the air from the channel 66 or cavity in which the bead is molded while the pressure of the sheet between the trim die and stripper plate squeezes material into the bead forming mold cavity. This operates to form the upper surface or finish of the bead 66 against the molding surface 65. The compression of the material between the trim die 33 and the surface 72 also forces sufficient material into the bead to form the bottom portion thereof, giving it a substantially cylindrical surface. After the squeezing action which forms the bead, the male members 10 are moved downwardly so that the knife edges 65b shear the plastic sheet as the vertical shearing surfaces 65a are moved downward to and across the shearing edges 65c of the trim die 33.

Fig. 8 illustrates diagrammatically a mechanism which can be used for transferring the sheets 12 to the different stations, designated 1, 2, 3, and 4. This mechanism comprises a carriage 80 to which are attached holders 81 for gripping and holding the sheets 12. When a sheet 12 has been placed in the holder at station 1 the carriage is given a step rotation to bring the sheet to station 2, where heating means is located. Such heating means may comprise a series of electrical resistors 82. The resistors are connected in circuit with the mains 83 supplying electric current from any suitable source. The sheet 12, when positioned over the resistors, is heated to the required temperature and plastic condition to permit the molding operations. The carriage 80 is then indexed to bring the plastic sheet to station 3, where the molding and shearing operations are carried on in the manner heretofore described. The next step rotation of the carriage brings the scrap sheet to station 4, where it may be removed from the frame 81. The construction permits the operations at the several stations to take place concurrently.

Modifications may be resorted to within the spirit and scope of my invention as defined in the appended claims.

I claim:

1. The method of forming a container from sheet material in a plastic moldable condition, which method comprises draping the plastic sheet material over a forming mold and molding said material to the shape of the mold to form the body portion of the article, gripping the plastic sheet between surfaces surrounding the mold and squeezing a portion of the material of the gripped portion of the sheet toward the article being molded to form an annular head portion of increased thickness on the article, and severing the molded article from the sheet by shearing the sheet between the mold and said surfaces by a relative movement of the mold and said surfaces by which the mold is sheared through the sheet while the sheet is gripped between said surfaces, the sheet being within the grip of said surfaces along the line of severance.

2. In an apparatus for molding containers from thermoplastic sheet material while the material is in a heated plastic moldable condition, wherein is included a holding means for engaging a marginal portion of a sheet of said material to manipulate the sheet, a molding head, means for relatively moving the sheet holding means and the molding head into position to drape the material over the molding head, and suction means for shaping the sheet material to the molding head to form a body of the container, the improvement for shaping an annular bead at the rim of the container to finish the container and for trimming it from the sheet, said improvement comprising a trim die having an annular shearing edge, the shearing edge being coplanar with the outer periphery of the mold, a plate formed with an area through which the mold extends, said mold and plate being capable of relative movement, means for moving the trim die and plate toward each other into position to grip the sheet between the plate and trim die and squeeze the plastic sheet therebetween so as to displace a portion of the plastic toward the mold, and means for shifting the mold relative to the trim die and plate past the shearing edge of the former, thereby shearing the container from the sheet while the latter is gripped between the trim die and plate.

3. The method of forming a hollow article from sheet material in a plastic moldable condition, which method comprises draping the plastic sheet material over a forming mold and molding the material to form the article, gripping the sheet between surfaces extending around the mold and with sufficient pressure applied by said surfaces to the material therebetween to squeeze a substantial portion of the material from between said surfaces sufficient to form a rim portion of the molded article into a bead of greater diameter in cross section than the thickness of the adjoining wall portions of the molded article and while the material is still in a plastic moldable condition, and severing the molded article from the sheet along said rim portion.

4. The method defined in claim 3, said method comprising shaping a surface portion of the bead by a molding surface and shaping an opposite portion of the bead in the open by the pressure applied by said surfaces.

5. The method of forming a container from plastic material in sheet form and in moldable plastic condition, which method comprises draping the sheet over a mold and conforming the draped material to the shape of the mold surface to form the body portion of the article, squeezing a portion of the sheet to the form of an annular bead surrounding and integral with the body portion molded article and of greater diameter in cross section than the thickness of the adjoining wall portions of the article, said molding of the bead being effected while said bead is still united with the said sheet and, while the material remains in plastic condition, shearing the bead from the sheet.

6. The apparatus defined in claim 2, said plate being formed with an annular recess in its under surface positioned to surround the mold and separated from the mold by a circular rib, the bottom surface of said rib positioned to form one said surface for squeezing the plastic.

References Cited in the file of this patent

UNITED STATES PATENTS

| | | |
|---|---|---|
| Re. 23,171 | Borkland | Nov. 29, 1949 |
| 1,668,349 | Baum | May 1, 1928 |
| 1,856,319 | Cooper | May 3, 1932 |
| 2,120,328 | Ferngren | June 14, 1938 |
| 2,221,197 | Martin | Nov. 12, 1940 |
| 2,255,117 | Helmstaedter | Sept. 9, 1941 |
| 2,270,187 | Dulmage | Jan. 13, 1942 |
| 2,408,734 | Chaplin | Oct. 8, 1946 |
| 2,691,798 | Winchester et al. | Oct. 19, 1954 |
| 2,748,425 | Coffey | June 5, 1956 |

OTHER REFERENCES

"Vacuum Forming," published in Modern Plastics, vol. 31, No. 9, May 1954 (pages 90, 91).